United States Patent
Mishra et al.

(10) Patent No.: US 10,552,239 B2
(45) Date of Patent: Feb. 4, 2020

(54) MESSAGE RECALL

(75) Inventors: Sujeet Mishra, Bangalore (IN); Ruchir P Jha, Bangalore (IN); Lohitashwa Thyagaraj, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2022 days.

(21) Appl. No.: 12/628,773

(22) Filed: Dec. 1, 2009

(65) Prior Publication Data
US 2011/0131281 A1 Jun. 2, 2011

(51) Int. Cl.
G06F 9/54 (2006.01)

(52) U.S. Cl.
CPC .................... G06F 9/546 (2013.01)

(58) Field of Classification Search
CPC .......... G06F 15/16; G06F 9/546; G06F 9/542; G06F 2209/547; H04L 51/34
USPC ......................................................... 709/206
See application file for complete search history.

(56) References Cited

U.S. PATENT DOCUMENTS

| | | | | |
|---|---|---|---|---|
| 6,721,779 B1 * | 4/2004 | Maffeis | ............... | H04L 29/06 709/202 |
| 8,073,122 B2 * | 12/2011 | Kay et al. | ............... | 379/201.01 |
| 2004/0078439 A1 * | 4/2004 | Staack | ............... | 709/206 |
| 2004/0148356 A1 * | 7/2004 | Bishop, Jr. | ............... | H04L 51/38 709/206 |
| 2005/0136884 A1 * | 6/2005 | Reidelsturz et al. | ............... | 455/403 |
| 2006/0282524 A1 * | 12/2006 | Lacombe et al. | ............... | 709/224 |
| 2007/0073821 A1 * | 3/2007 | Brail | ............... | 709/206 |
| 2008/0134202 A1 * | 6/2008 | Craggs et al. | ............... | 719/313 |
| 2008/0256553 A1 * | 10/2008 | Cullen | ............... | G06Q 30/02 719/313 |
| 2008/0317228 A1 * | 12/2008 | Kay et al. | ............... | 379/201.01 |
| 2009/0325570 A1 * | 12/2009 | Rensin et al. | ............... | 455/422.1 |
| 2010/0093441 A1 * | 4/2010 | Rajaraman et al. | ............... | 463/42 |
| 2010/0304766 A1 * | 12/2010 | Goyal | ............... | H04L 12/5885 455/466 |
| 2011/0078247 A1 * | 3/2011 | Jackson et al. | ............... | 709/206 |

OTHER PUBLICATIONS

BEA Systems, "JMS Queue: Monitoring: Messages: Delete Messages", http://download.oracle.com/docs/cd/E13222_01/wls/docs90/ConsoleHelp/pagehelp/JMSjmsmessagedeletejmsmessagetitle.html.

* cited by examiner

Primary Examiner — Viet D Vu
(74) Attorney, Agent, or Firm — Cuenot, Forsythe & Kim, LLC

(57) ABSTRACT

There is provided a method for recalling a message. The method comprises receiving a message from a publisher, sending the message to a durable subscriber for queuing pending consumption by a subscriber. When a message recall request identifying the message is received, the unconsumed message is deleted from the durable subscriber.

15 Claims, 4 Drawing Sheets

MESSAGE RECALL

BACKGROUND

In Message Orientated Messaging (MOM), if an instance of a subscriber is offline when the message for the subscriber is published, the message may be cached in a durable subscriber, pending delivery until such time that the subscriber is instantiated again.

However, in some instances, a pending message may become obsolete and therefore should be recalled before being consumed by the subscriber instance.

Existing arrangements allow for the post publication deletion of messages. One such example that discloses means to delete a published message is: http://download.oracle.com/docs/cd/E13222_01/wls/docs90/ConsoleHelp/pagehelp/JMSjmsmessagedeletejmsmessagetitle.html.

However, while existing arrangements allow for published messages to be deleted, existing arrangements suffer from the disadvantage of not being able to recall unconsumed messages.

Furthermore, in existing arrangements, as neither publishers nor message brokers retain the consumption state of published messages, it is not possible to recall unconsumed message.

A need therefore exists to recall unconsumed messages. An object of the present invention is to overcome or at least substantially ameliorate these and other disadvantages of existing arrangements.

SUMMARY

There is provided a method for recalling a message. The method comprises receiving a message from a publisher, sending the message to a durable subscriber for queuing pending consumption by a subscriber. When a message recall request identifying the message is received, the unconsumed message is deleted from the durable subscriber.

There is also provided a system for recalling a message. The system comprises an input for receiving a message from a publisher and an output for sending the message to a durable subscriber for queuing pending consumption by a subscriber. When the input receives a message recall request identifying said message, a processor deletes the unconsumed message from the durable subscriber.

DRAWINGS

At least one embodiment of the present invention will now be described with reference to the drawings in which.

Figure 3A:
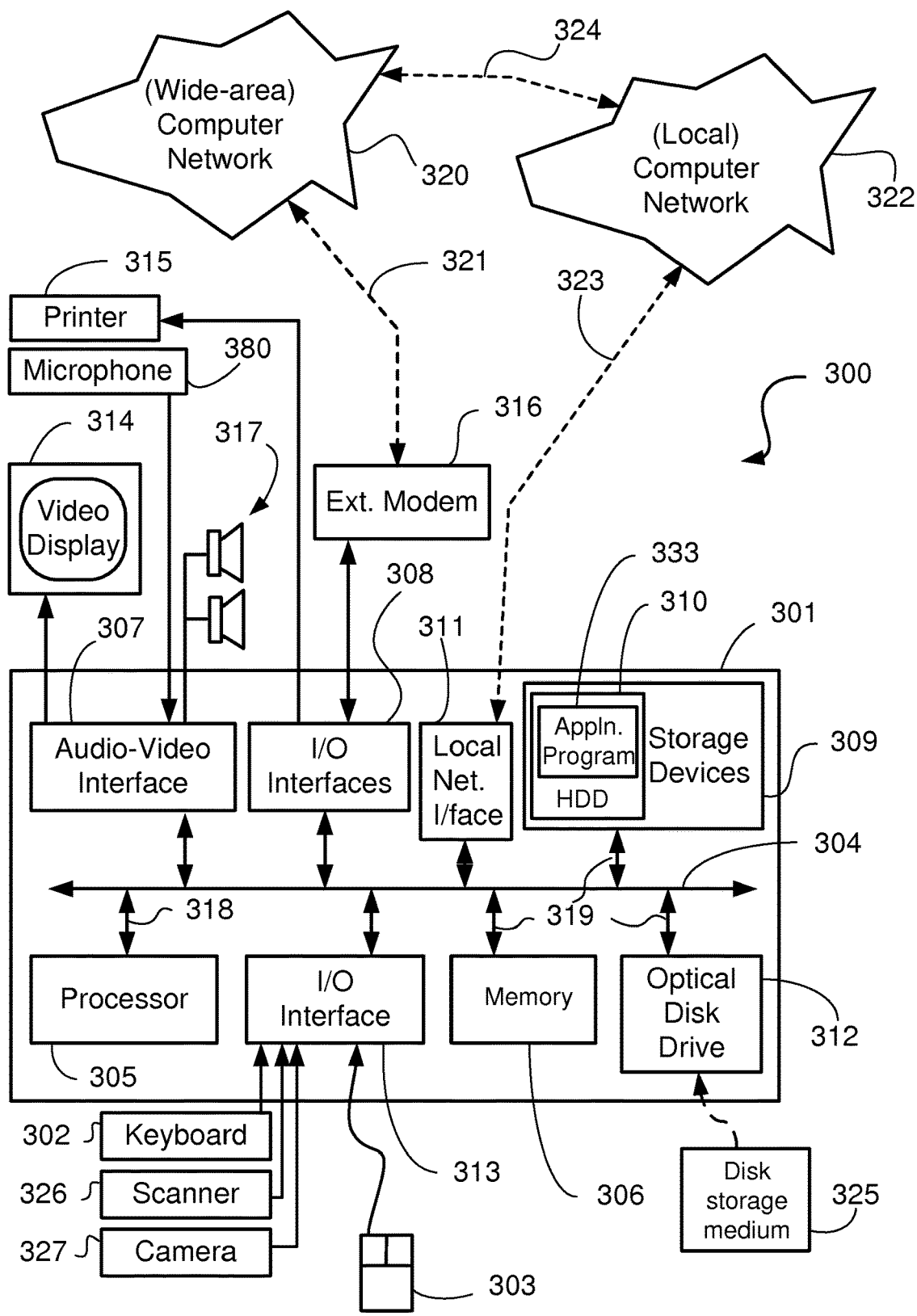
Figure 3B:
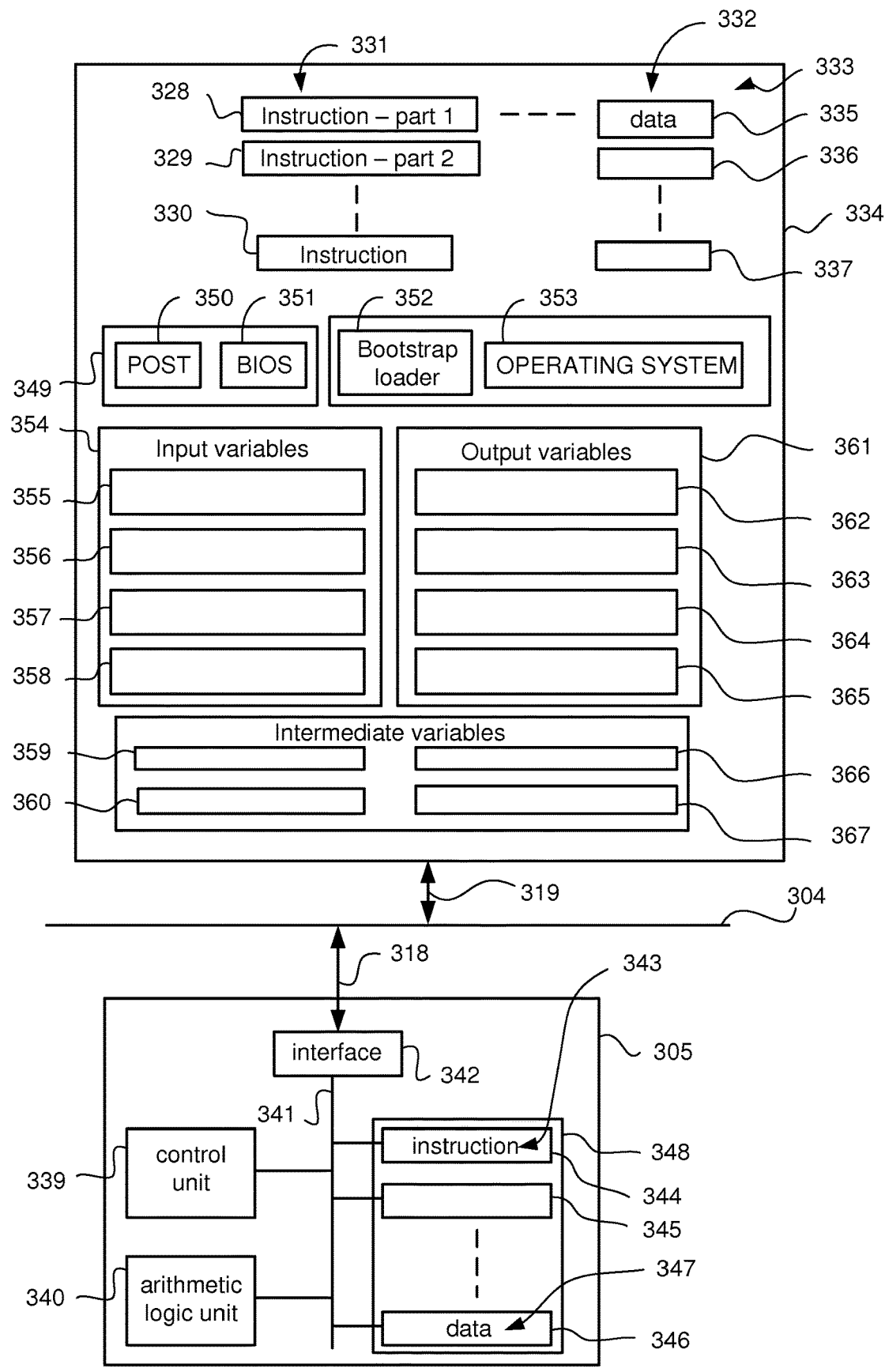

FIGS. 3A and 3B form a schematic block diagram of a general purpose computer system upon which the described arrangements may be practised.

DETAILED DESCRIPTION

Where reference is made in any one or more of the accompanying drawings to steps and/or features, which have the same reference numerals, those steps and/or features have for the purposes of this description the same function(s) or operation(s), unless the contrary intention appears.

Figure 1:
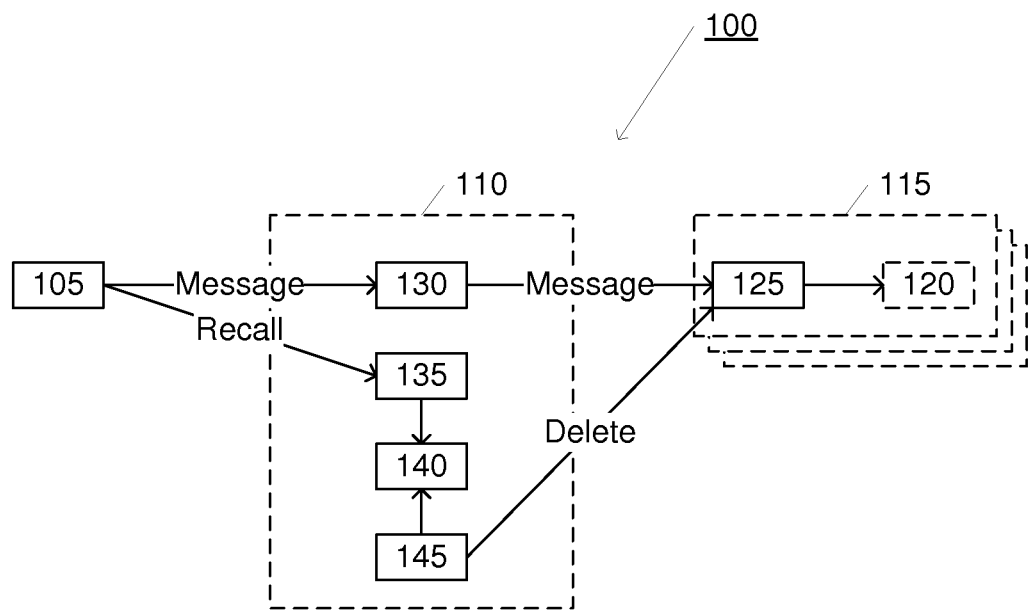
FIG. 1 shows a system 100 for recalling a message.

FIG. 1 shows a system 100 for recalling a message. The system comprises a publisher 105 for publishing messages, a message manager 110 for managing the delivery of messages and one or more subscribers 115.

Subscriber 115 may comprise a subscriber instance 120 and a durable subscriber 125. The durable subscriber 125 queues messages pending consumption by the subscriber instance 120.

Message manager 110 comprises a broker 130 for granting subscriptions and forwarding messages to subscribers 115. Message manager 110 further comprises a message recall API 135 for receiving message recall requests, a message recall queue 140 and a message cleanup agent 145.

Figure 2:
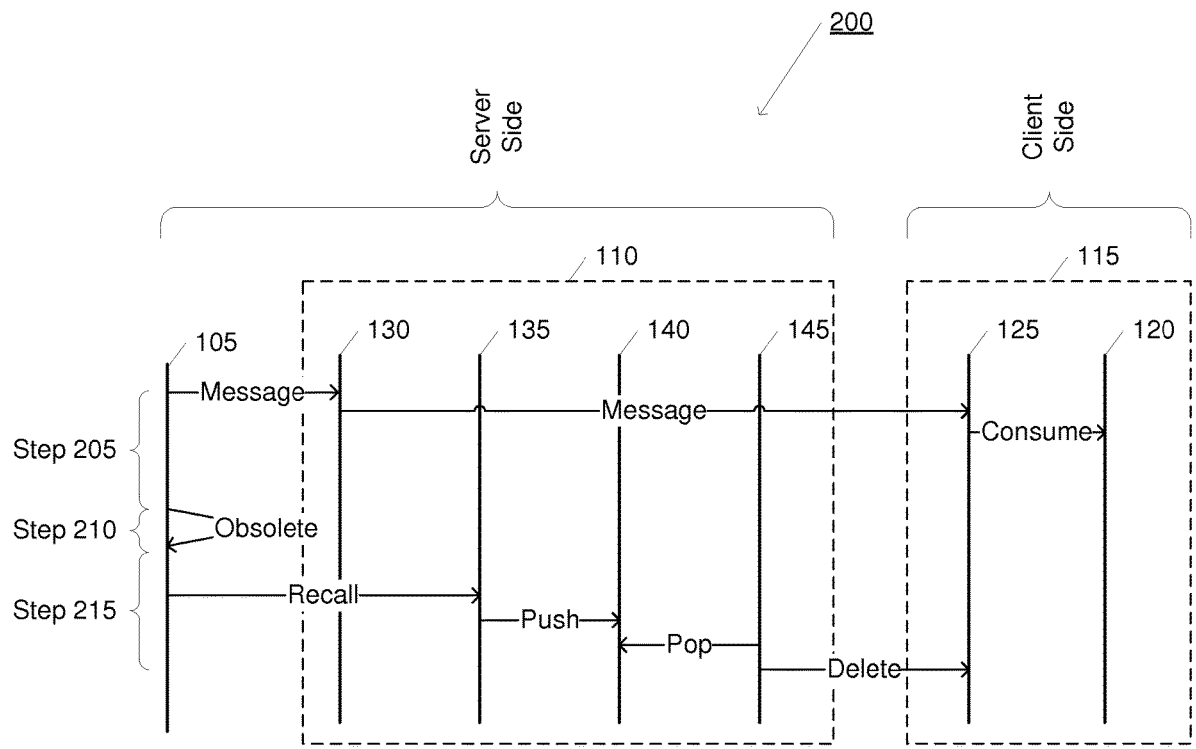
FIG. 2 shows a method 200 for recalling a message.

FIG. 2 shows a method 200 for recalling a message. The method 200 starts at step 205 where the publisher 105 publishes a message to the broker 130. The message may comprise a messageid and a topicid. The broker 130 federates the message to the subscribers 115 that are subscribed to the topicid.

At step 210 the publisher 105 determines that the message is obsolete and should be recalled. For example, a customer of a banking application may create a change address request using the bank's front end application. The front end application may then publish the change address message to a topic to which all the backend processing applications have subscribed to. However, if the customer then closes the account, the front end application may determine that the change address message will no longer be relevant to the backend processing applications. While some of the change address messages may already have been consumed by backend processing applications, there may be messages that have not been consumed because the backend processing application is no longer online or otherwise available. As such, the front end application may wish to recall the pending messages as the pending messages are no longer relevant.

In another example, a stock quote application may publish messages to a stock-quote topic to which multiple durable subscribers are subscribed. However, the subsequent but substantially contemporise arrival of a new stock quote may render the already published message obsolete. As such, the stock quote application may wish to recall the already published message and issue a new message.

In a further example, in a Credit Card defaulting system, if a message is published indicating that a member has defaulted, and either the message was sent in error or the member subsequently pays the amount outstanding, the message may need to be recalled.

At step 215 the publisher issues a message recall request to the message recall API 135. The message recall request may comprise the messageid and the topicid of the message to be deleted.

The message recall API 135 pushes the message recall request to the message recall queue 140. The message cleanup agent 145 pops the message recall request from the message recall queue 140.

The message cleanup agent 145 determines those durable subscribers 125 in which the message to be recalled may be queued for consumption. Specifically, the message cleanup agent 145 uses the topicid of the message recall request to query the broker 130 for the subscribers 115 that are subscribed to the topicid and the durable subscribers 125 that the message to be deleted was sent to. The message cleanup agent 145 then pops or deletes all messages matching the messageid from the identified durable subscribers. If the message has already been consumed by the subscriber instance 120, the message cannot be recalled.

FIGS. 3A and 3B collectively form a schematic block diagram of a general purpose computer system 300, upon which the various arrangements described can be practised.

As seen in FIG. 3A, the computer system 300 is formed by a computer module 301, input devices such as a keyboard 302, a mouse pointer device 303, a scanner 326, a camera 327, and a microphone 380, and output devices including a printer 315, a display device 314 and loudspeakers 317. An external Modulator-Demodulator (Modem) transceiver device 316 may be used by the computer module 301 for communicating to and from a communications network 320 via a connection 321. The network 320 may be a wide-area network (WAN), such as the Internet or a private WAN. Where the connection 321 is a telephone line, the modem 316 may be a traditional "dial-up" modern. Alternatively, where the connection 321 is a high capacity (eg: cable) connection, the modem 316 may be a broadband modem. A wireless modem may also be used for wireless connection to the network 320.

The computer module 301 typically includes at least one processor unit 305, and a memory unit 306 for example formed from semiconductor random access memory (RAM) and semiconductor read only memory (ROM). The module 301 also includes an number of input/output (I/O) interfaces including an audio-video interface 307 that couples to the video display 314, loudspeakers 317 and microphone 380, an I/O interface 313 for the keyboard 302, mouse 303, scanner 326, camera 327 and optionally a joystick (not illustrated), and an interface 308 for the external modem 316 and printer 315. In some implementations, the modem 316 may be incorporated within the computer module 301, for example within the interface 308. The computer module 301 also has a local network interface 311 which, via a connection 323, permits coupling of the computer system 300 to a local computer network 322, known as a Local Area Network (LAN). As also illustrated, the local network 322 may also couple to the wide network 320 via a connection 324, which would typically include a so-called "firewall" device or device of similar functionality. The interface 311 may be formed by an Ethernet™ circuit card, a Bluetooth™ wireless arrangement or an IEEE 802.11 wireless arrangement.

The interfaces 308 and 313 may afford either or both of serial and parallel connectivity, the former typically being implemented according to the Universal Serial Bus (USB) standards and having corresponding USB connectors (not illustrated). Storage devices 309 are provided and typically include a hard disk drive (HDD) 310. Other storage devices such as a floppy disk drive and a magnetic tape drive (not illustrated) may also be used. An optical disk drive 312 is typically provided to act as a non-volatile source of data. Portable memory devices, such optical disks (eg: CD-ROM, DVD), USB-RAM, and floppy disks for example may then be used as appropriate sources of data to the system 300.

The components 305 to 313 of the computer module 301 typically communicate via an interconnected bus 304 and in a manner which results in a conventional mode of operation of the computer system 300 known to those in the relevant art. Examples of computers on which the described arrangements can be practised include IBM-PC's and compatibles, Sun Sparcstations™, Apple Mac™ or computer systems evolved therefrom.

The method 200 of recalling a message may be implemented using the computer system 300 wherein the processes of FIGS. 1 and 2, may be implemented as one or more software application programs 333 executable within the computer system 300. In particular, the steps of the method 200 of recalling a message are effected by instructions 331 in the software 333 that are carried out within the computer system 300. The software instructions 331 may be formed as one or more code modules, each for performing one or more particular tasks. The software may also be divided into two separate parts, in which a first part and the corresponding code modules performs the message recall methods and a second part and the corresponding code modules manage a user interface between the first part and the user.

The software 333 is generally loaded into the computer system 300 from a computer readable medium, and is then typically stored in the HDD 310, as illustrated in FIG. 3A, or the memory 306, after which the software 333 can be executed by the computer system 300. In some instances, the application programs 333 may be supplied to the user encoded on one or more CD-ROM 325 and, read via the corresponding drive 312 prior to storage in the memory 310 or 306. Alternatively the software 333 may be read by the computer system 300 from the networks 320 or 322 or loaded into the computer system 300 from other computer readable media. Computer readable storage media refers to any storage medium that participates in providing instructions and/or data to the computer system 300 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 301. Examples of computer readable transmission media that may also participate in the provision of software, application programs, instructions and/or data to the computer module 301 include radio or infra-red transmission channels as well as a network connection to another computer or networked device, and the Internet or Intranets including e-mail transmissions and information recorded on Websites and the like.

The second part of the application programs 333 and the corresponding code modules mentioned above may be executed to implement one or more graphical user interfaces (GUIs) to be rendered or otherwise represented upon the display 314. Through manipulation of typically the keyboard 302 and the mouse 303, a user of the computer system 300 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 317 and user voice commands input via the microphone 380.

FIG. 3B is a detailed schematic block diagram of the processor 305 and a "memory" 334. The memory 334 represents a logical aggregation of all the memory devices (including the HDD 310 and semiconductor memory 306) that can be accessed by the computer module 301 in FIG. 3A.

When the computer module 301 is initially powered up, a power-on self-test (POST) program 350 executes. The POST program 350 is typically stored in a ROM 349 of the semiconductor memory 306. A program permanently stored in a hardware device such as the ROM 349 is sometimes referred to as firmware. The POST program 350 examines hardware within the computer module 301 to ensure proper functioning, and typically checks the processor 305, the memory (309, 306), and a basic input-output systems software (BIOS) module 351, also typically stored in the ROM 349, for correct operation. Once the POST program 350 has run successfully, the BIOS 351 activates the hard disk drive 310. Activation of the hard disk drive 310 causes a bootstrap loader program 352 that is resident on the hard disk drive 310 to execute via the processor 305. This loads an operating system 353 into the RAM memory 306 upon which the operating system 353 commences operation. The operating system 353 is a system level application, executable by the processor 305, to fulfil various high level functions, including processor management, memory management, device management, storage management, software application interface, and generic user interface.

The operating system 353 manages the memory (309, 306) in order to ensure that each process or application running on the computer module 301 has sufficient memory in which to execute without colliding with memory allocated to another process. Furthermore, the different types of memory available in the system 300 must be used properly so that each process can run effectively. Accordingly, the aggregated memory 334 is not intended to illustrate how particular segments of memory are allocated (unless otherwise stated), but rather to provide a general view of the memory accessible by the computer system 300 and how such is used.

The processor 305 includes a number of functional modules including a control unit 339, an arithmetic logic unit (ALU) 340, and a local or internal memory 348, sometimes called a cache memory. The cache memory 348 typically includes a number of storage registers 344-346 in a register section. One or more internal buses 341 functionally interconnect these functional modules. The processor 305 typically also has one or more interfaces 342 for communicating with external devices via the system bus 304, using a connection 318.

The application program 333 includes a sequence of instructions 331 that may include conditional branch and loop instructions. The program 333 may also include data 332 which is used in execution of the program 333. The instructions 331 and the data 332 are stored in memory locations 328-330 and 335-337 respectively. Depending upon the relative size of the instructions 331 and the memory locations 328-330, a particular instruction may be stored in a single memory location as depicted by the instruction shown in the memory location 330. Alternately, an instruction may be segmented into a number of parts each of which is stored in a separate memory location, as depicted by the instruction segments shown in the memory locations 328-329.

In general, the processor 305 is given a set of instructions which are executed therein. The processor 305 then waits for a subsequent input, to which it reacts to by executing another set of instructions. Each input may be provided from one or more of a number of sources, including data generated by one or more of the input devices 302, 303, data received from an external source across one of the networks 320, 322, data retrieved from one of the storage devices 306, 309 or data retrieved from a storage medium 325 inserted into the corresponding reader 312. The execution of a set of the instructions may in some cases result in output of data. Execution may also involve storing data or variables to the memory 334.

The disclosed message recall arrangements use input variables 354, that are stored in the memory 334 in corresponding memory locations 355-358. The message recall arrangements produce output variables 361 that are stored in the memory 334 in corresponding memory locations 362-365. Intermediate variables may be stored in memory locations 359, 360, 366 and 367.

The register section 344-346, the arithmetic logic unit (ALU) 340, and the control unit 339 of the processor 305 work together to perform sequences of micro-operations needed to perform "fetch, decode, and execute" cycles for every instruction in the instruction set making up the program 333. Each fetch, decode, and execute cycle comprises:

(a) a fetch operation, which fetches or reads an instruction 331 from a memory location 328;

(b) a decode operation in which the control unit 339 determines which instruction has been fetched; and (c) an execute operation in which the control unit 339 and/or the ALU 340 execute the instruction.

Thereafter, a further fetch, decode, and execute cycle for the next instruction may be executed. Similarly, a store cycle may be performed by which the control unit 339 stores or writes a value to a memory location 332.

Each step or sub-process in the processes of FIGS. 1 and 2 is associated with one or more segments of the program 333, and is performed by the register section 344-347, the ALU 340, and the control unit 339 in the processor 305 working together to perform the fetch, decode, and execute cycles for every instruction in the instruction set for the noted segments of the program 333.

The method 200 of recalling a message may alternatively be implemented in dedicated hardware such as one or more integrated circuits performing the functions or sub functions of recalling a message. Such dedicated hardware may include graphic processors, digital signal processors, or one or more microprocessors and associated memories.

The foregoing describes only some embodiments of the present invention, and modifications and/or changes can be made thereto without departing from the scope and spirit of the invention, the embodiments being illustrative and not restrictive.

We claim:

1. A method, performed within and by a publish/subscribe server having a broker, a message recall API, and a message cleanup agent, comprising:

identifying a plurality of subscriber instances subscribed to a topic;

receiving, by the broker and from a publisher, a message directed to the topic;

sending the message, from the publish/subscribe server, to a plurality of durable subscribers respectively associated with the identified plurality of subscriber instances;

receiving, by the message recall API and from the publisher of the message, a message recall request including a topicid of the message;

identifying, using the topicid and with a communication between the message cleanup agent and the broker, subscribers instances that have not consumed the message; and instructing, by message cleanup agent, durable subscriber respectively associated with the subscriber instances that have not consumed the message to delete the message, wherein each of the durable subscribers respectively associated with the subscriber instances that have not consumed the message has not sent the message to the subscriber instance with which each of the durable subscribers is associated.

2. The method of claim 1, wherein the message is sent to the plurality of durable subscribers respectively associated with the identified plurality of subscriber instances based upon the identified plurality of durable subscriber instances each being subscribed to the topicid.

3. The method of claim 1, wherein the message recall API places the message recall request in a queue.

4. The method of claim 3, wherein
the message cleanup agent pops the message recall request from the queue.

5. The method of claim 4, wherein
the message cleanup agent performs the instructing.

6. A publish/subscribe server having a broker, a message recall API, and a message cleanup agent, comprising:
a hardware processor configured to perform:
identifying a plurality of subscriber instances subscribed to a topic;
receiving, by the broker and from a publisher, a message directed to the topic;
sending the message, from the publish/subscribe server, to a plurality of durable subscribers respectively associated with the identified plurality of subscriber instances;
receiving, by the message recall API and from the publisher of the message, a message recall request including a topicid of the message;
identifying, using the topicid and with a communication between the message cleanup agent and the broker, subscribers instances that have not consumed the message; and
instructing, by message cleanup agent, durable subscriber respectively associated with the subscriber instances that have not consumed the message to delete the message, wherein
each of the durable subscribers respectively associated with the subscriber instances that have not consumed the message has not sent the message to the subscriber instance with which each of the durable subscribers is associated.

7. The server of claim 6, wherein
the message is sent to the plurality of durable subscribers respectively associated with the identified plurality of subscriber instances based upon the identified plurality of durable subscriber instances each being subscribed to the topicid.

8. The server of claim 6, wherein
the message recall API places the message recall request in a queue.

9. The server of claim 8, wherein
the message cleanup agent pops the message recall request from the queue.

10. The server of claim 9, wherein
the message cleanup agent performs the instructing.

11. A computer program product, comprising:
a computer-usable storage medium having stored therein computer-usable program code,
the computer-usable program code, which when executed by a publish/subscribe server having a broker, a message recall API, and a message cleanup agent, causes the publish/subscribe server to perform:
identifying a plurality of subscriber instances subscribed to a topic;
receiving, by the broker and from a publisher, a message directed to the topic;
sending the message, from the publish/subscribe server, to a plurality of durable subscribers respectively associated with the identified plurality of subscriber instances;
receiving, by the message recall API and from the publisher of the message, a message recall request including a topicid of the message;
identifying, using the topicid and with a communication between the message cleanup agent and the broker, subscribers instances that have not consumed the message; and
instructing, by message cleanup agent, durable subscriber respectively associated with the subscriber instances that have not consumed the message to delete the message, wherein
each of the durable subscribers respectively associated with the subscriber instances that have not consumed the message has not sent the message to the subscriber instance with which each of the durable subscribers is associated.

12. The computer program product of claim 11, wherein
the message is sent to the plurality of durable subscribers respectively associated with the identified plurality of subscriber instances based upon the identified plurality of durable subscriber instances each being subscribed to the topicid.

13. The computer program product of claim 11, wherein
the message recall API places the message recall request in a queue.

14. The computer program product of claim 13, wherein
the message cleanup agent pops the message recall request from the queue.

15. The computer program product of claim 14, wherein
the message cleanup agent performs the instructing.

* * * * *